(12) United States Patent
Bedarrides et al.

(10) Patent No.: US 9,784,326 B2
(45) Date of Patent: Oct. 10, 2017

(54) AIRCRAFT LANDING GEAR WITH A BI-DIRECTIONAL CLUTCH

(71) Applicant: AIRBUS OPERATIONS LIMITED, Bristol (GB)

(72) Inventors: Jeremy Bedarrides, Toulouse (FR); Malcolm George Sibley, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 15/349,558

(22) Filed: Nov. 11, 2016

(65) Prior Publication Data

US 2017/0058971 A1    Mar. 2, 2017

Related U.S. Application Data

(63) Continuation of application No. 14/410,664, filed as application No. PCT/GB2013/051549 on Jun. 12, 2013, now Pat. No. 9,527,583.

(30) Foreign Application Priority Data

Jun. 28, 2012 (GB) .................................. 1211501.0

(51) Int. Cl.
*F16D 41/08* (2006.01)
*B64C 25/40* (2006.01)
*B64C 25/44* (2006.01)

(52) U.S. Cl.
CPC .......... *F16D 41/086* (2013.01); *B64C 25/405* (2013.01); *B64C 25/44* (2013.01);
(Continued)

(58) Field of Classification Search
CPC ..... B64C 25/405; B64C 25/44; F16D 41/067; F16D 41/088; F16D 41/105; F16D 41/086
See application file for complete search history.

(56) References Cited

U.S. PATENT DOCUMENTS 1,812,143 A     6/1931  Dugan
2,181,244 A  *  11/1939  McGrew ................. B61C 15/02
                                                                  105/124
(Continued)

FOREIGN PATENT DOCUMENTS

EP          2447154 A2     5/2012
EP          2455634 A1     5/2012
(Continued)

OTHER PUBLICATIONS

International Search Report mailed Oct. 22, 2013 in International Application No. PCT/GB2013/051549, filed Jun. 12, 2013.
(Continued)

*Primary Examiner* — Tien Dinh
*Assistant Examiner* — Alexander V Giczy
(74) *Attorney, Agent, or Firm* — Hauptman Ham, LLP

(57) ABSTRACT

An aircraft landing gear including a wheel rotatable about an axle, a motor, and a bi-directional overrunning clutch, such as a roller or sprag clutch, operable to either connect the wheel with the motor or disconnect the wheel from the motor. The bi-directional clutch includes a ring-shaped overrunning track connected to the wheel by a plurality of drive keys, a ring-shaped drive track connected to the motor and concentrically aligned with the overrunning track, and a plurality of movable elements, each separately and individually movable, retained between the overrunning track and the drive track.

16 Claims, 6 Drawing Sheets

(52) U.S. Cl.
CPC .......... *F16D 41/084* (2013.01); *Y02T 50/823* (2013.01); *Y10T 74/19614* (2015.01)

(56) References Cited

U.S. PATENT DOCUMENTS

| | | | |
|---|---|---|---|
| 2,262,330 A | | 11/1941 | MacNeil et al. |
| 2,460,387 A | | 2/1949 | Hunter |
| 2,681,718 A | | 6/1954 | Stoner |
| 3,059,712 A | | 10/1962 | Hautau |
| 3,075,623 A | * | 1/1963 | Lund ............ F16D 41/07 192/45.1 |
| 3,599,767 A | | 8/1971 | Sederquist |
| 3,977,631 A | * | 8/1976 | Jenny ............ B64C 25/405 188/71.5 |
| 4,659,039 A | | 4/1987 | Valdes |
| 6,176,359 B1 | | 1/2001 | Krisher |
| 6,409,001 B1 | | 6/2002 | Kerr |
| 8,042,670 B2 | * | 10/2011 | Bartos ............ F16D 41/16 192/43.1 |
| 2004/0003976 A1 | * | 1/2004 | Pederson ............ F16D 41/069 192/45.1 |
| 2006/0065779 A1 | | 3/2006 | McCoskey et al. |
| 2007/0158497 A1 | | 7/2007 | Edelson et al. |
| 2008/0099294 A1 | | 5/2008 | Lee |
| 2008/0258014 A1 | * | 10/2008 | McCoskey ............ B60L 7/10 244/221 |
| 2010/0084242 A1 | * | 4/2010 | Lewis ............ F16D 13/52 192/111.15 |
| 2011/0156472 A1 | | 6/2011 | Bucheton et al. |
| 2011/0297786 A1 | * | 12/2011 | Sweet ............ B64C 25/405 244/103 R |
| 2012/0080249 A1 | * | 4/2012 | Yates, III ............ B60L 7/18 180/65.31 |
| 2012/0138734 A1 | | 6/2012 | Hissong |
| 2012/0152686 A1 | * | 6/2012 | Brewer ............ F16D 27/10 192/84.1 |

FOREIGN PATENT DOCUMENTS

FR 2954236 A1 6/2011
WO 2011/023505 A2 3/2011

OTHER PUBLICATIONS

Written Opinion mailed Oct. 22, 2013 in International Application No. PCT/GB2013/051549, filed Jun. 12, 2013.
Search Report dated Oct. 18, 2012 in Great Britain Application No. GB1211501.0.
EP Communication in EP Appln No. 13730055.4, dated Mar. 31, 2017.

* cited by examiner

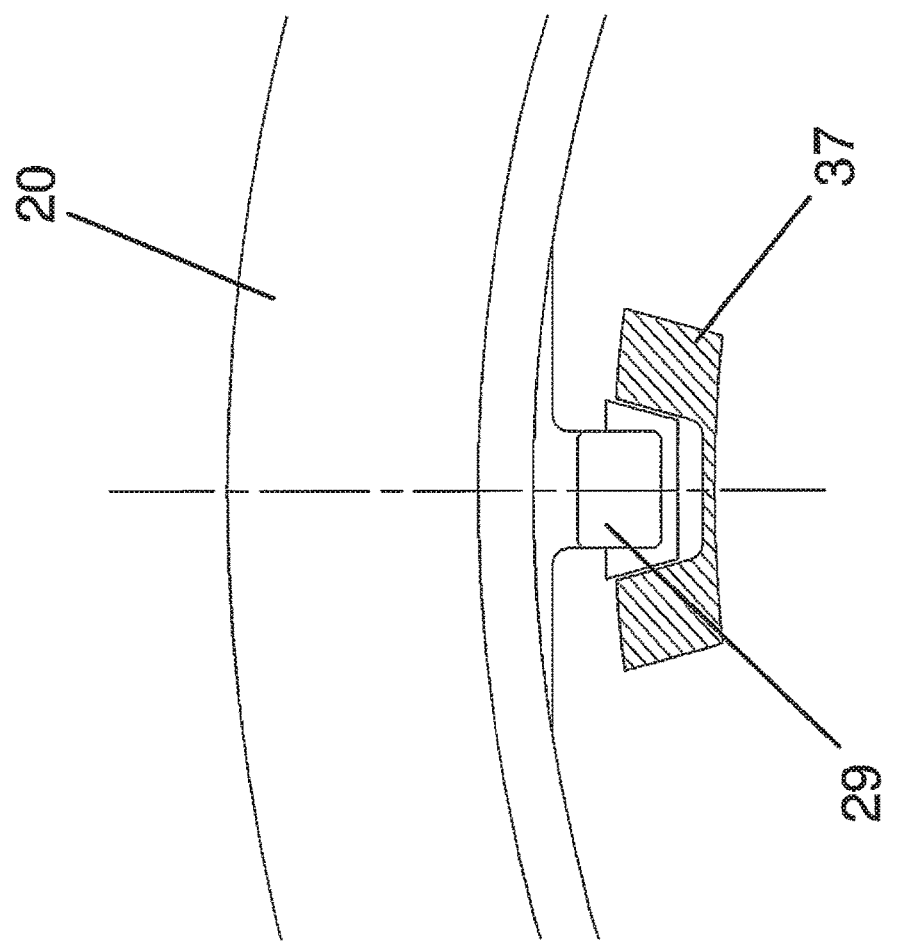

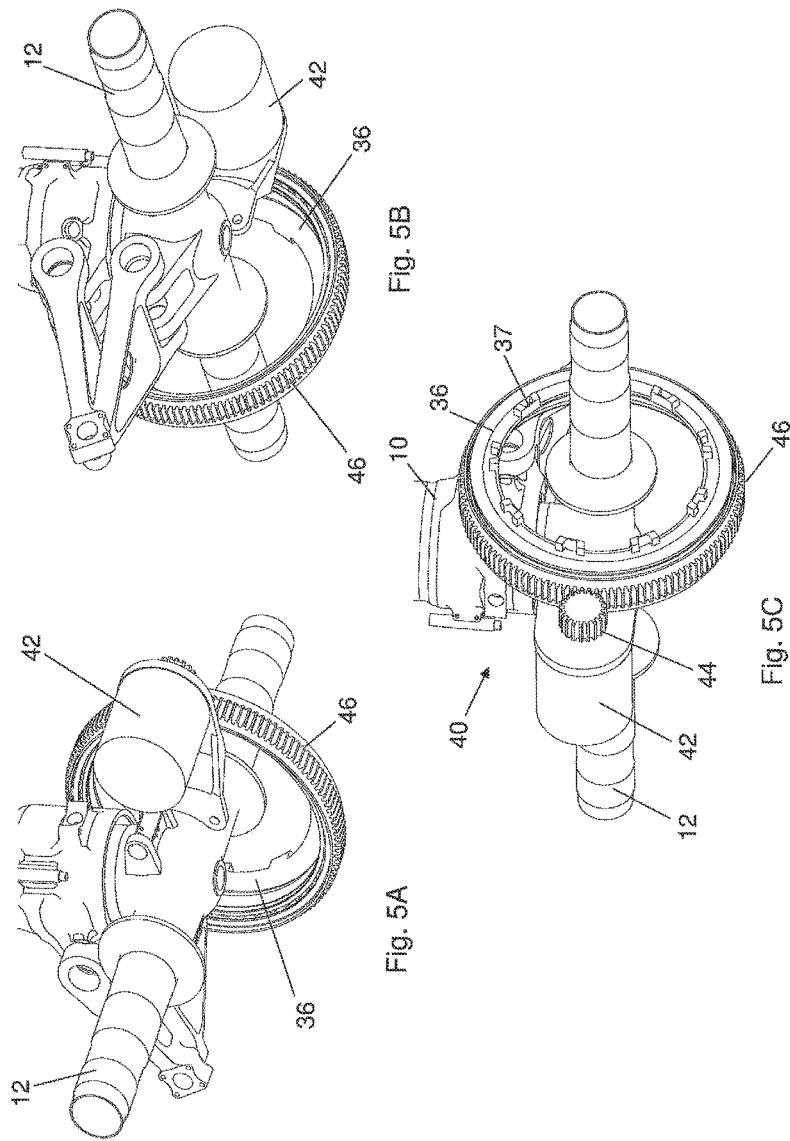

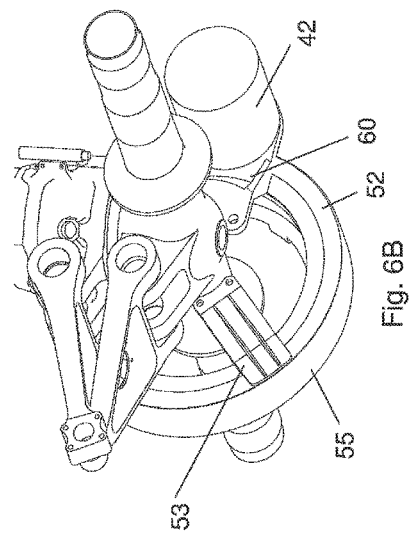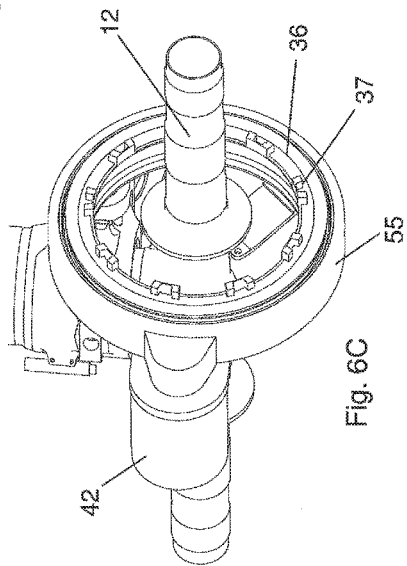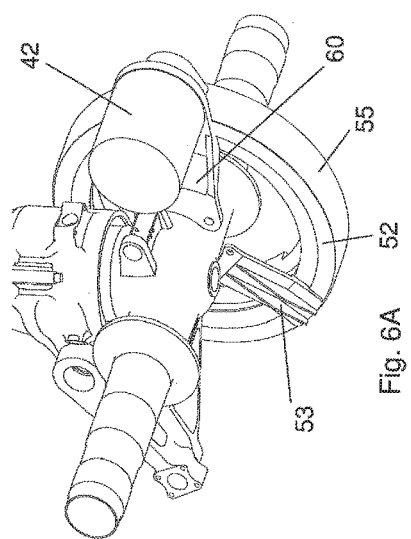

AIRCRAFT LANDING GEAR WITH A BI-DIRECTIONAL CLUTCH

CROSS-REFERENCE TO RELATED APPLICATIONS

This present application is a Continuation of U.S. application Ser. No. 14/410,664, filed Dec. 23, 2014, which is a National Phase of International Application Number PCT/GB2013/051549, filed Jun. 12, 2013, and claims priority to British Application Number 1211501.0, filed Jun. 28, 2012, the disclosures of which are hereby incorporated by reference herein in their entirety.

FIELD OF THE INVENTION

The present invention relates to an aircraft landing gear with a bi-directional clutch for permitting one or more wheels of the main landing gear to be operated in a driven mode for taxiing and an overrunning mode when required, for example during landing and take-off.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

Several autonomous ground taxi systems for driving the wheels while the aircraft is on the ground have been proposed in recent years. Since brakes are installed within the wheels of aircraft main landing gear, this region is very congested and there is little room for installing drive motors. Development of autonomous taxi systems has therefore typically been limited to the nose landing gear. An example is US2006/0065779, which discloses a powered nose aircraft wheel system in which a clutch is used to switch between a mode in which the wheel can spin freely and a mode in which the wheel can be driven by an electric motor. The clutch can also operate to enable the motor to pre-spin the wheel prior to landing. The clutch comprises an automatically disengaged cone clutch mechanism.

However, nose landing gears only support a small fraction of the vertical loads supported by the landing gear as a whole during ground taxi operations (approximately 5% of the aircraft weight). The present inventors consider that there will therefore be insufficient traction between a driven nose landing gear wheel and the ground. This is a particular concern when the aircraft centre of gravity is towards its aft limit and when the ground surface is slippery.

SUMMARY OF THE INVENTION

At its most general, the present invention provides an aircraft landing gear comprising a wheel rotatable about an axle, a motor (which may include a gearbox), and a bi-directional overrunning clutch, such as a roller or sprag clutch, operable to either connect the wheel with the motor or disconnect the wheel from the motor.

A first aspect of the invention provides an aircraft landing gear, including: a wheel rotatable about an axle; a motor; and a bi-directional clutch operable to connect the wheel with the motor, the bi-directional clutch comprising a ring-shaped overrunning track connected to the wheel, a ring-shaped drive track connected to the motor and concentrically aligned with the overrunning track, and a plurality of movable elements retained between the overrunning track and the drive track, the movable elements being movable between: a driven configuration in which they prevent relative rotation between the drive track and the overrunning track to thereby permit the wheel to be driven by the motor; and an overrunning configuration in which they permit relative rotation between the drive track and the overrunning track to thereby disconnect the wheel from the motor.

This arrangement provides a compact apparatus for enabling the motor to be connected to the wheel for ground taxiing, but disconnected for landing or take-off. The compactness means that this arrangement is suitable for use on landing gear, such as main landing gear, which incorporate large braking assemblies that take up a lot of space near to the wheel inner hub. Existing landing gear ground taxi clutch arrangements, such as that disclosed in US2006/0065779, are not suitable for such applications because they take up the space near to the wheel inner hub which is required for braking systems.

A bi-directional clutch is used because it enables the drive track to drive the overrunning track in both rotational directions. The term overrunning refers to the feature that the overrunning track can rotate freely relative to the drive track when the movable elements are in the overrunning configuration. The overrunning track may be capable of freely rotating in both rotational directions.

The movable elements may be arranged to automatically move from the driven configuration to the overrunning configuration when the overrunning track is rotating faster than the drive track. This arrangement provides a failsafe mechanism ensuring that the wheel is always able to rotate freely during landing or take-off, even in cases where the drive track is inadvertently being driven by the motor. Moreover, the automatic movement between configurations may be entirely mechanical in roller or sprag clutches according to the present invention, thus avoiding any reliance on electrical signalling.

The driven configuration preferably comprises a forward driven configuration in which the wheel is driven by the motor in a first rotational direction, and a reverse driven configuration in which the wheel is driven by the motor in a second rotational direction opposite to the first rotational direction. Thus, the aircraft can ground taxi in both forwards and reverse directions.

In preferred embodiments the movable elements are biased towards the overrunning configuration. A resilient member may be arranged to bias the movable elements towards the overrunning configuration. This arrangement serves to provide a further failsafe to ensure that the wheel is always able to freely rotate during landing and take-off.

The drive track may be positioned radially outwardly from the overrunning track. Thus, the outer track is the drive track, while the inner track is the overrunning track. This arrangement enables the motor to be located radially outwardly from the wheel, so that it does not take up space near to the wheel required by braking systems. Thus, the landing gear preferably comprises a ring gear rigidly connected to the drive track and a pinion gear arranged to mesh with the ring gear, the pinion gear being rotatable by the motor. The pinion gear may be retractable from the ring gear, e.g. in the manner described in WO2011/023505.

Locating the drive track radially outwardly from the overrunning track also enables the clutch to be connected to an outer rim of the wheel, again leaving space near to the inner hub for essential braking systems. Thus, the wheel preferably comprises: an inner hub having a central bore through which the axle passes; and an outer rim to which the overrunning track is connected.

The movable elements may comprise a plurality of rollers and one or both of the drive track and the overrunning track may have a roller-facing face (contact face) with a corresponding plurality of indentations or protrusions formed thereon. Preferably, the drive track has a roller-facing face with the plurality of indentations formed thereon. The indentations may have a generally shallow arcuate shape forming ridges at the interconnections between neighbouring indentations. The protrusions may comprise a generally flat planar portion arranged parallel to a local tangent of the roller-facing face.

In other embodiments the movable elements may comprise sprags having a generally figure-of-eight shaped cross-section. Where the movable elements comprise sprags there (nay be no need to form indentations or protrusions in the roller-facing face of either the drive track or the overrunning track, although in some sprag embodiments indentations or protrusions may be formed in either track or both tracks.

The landing gear of the first aspect preferably comprises a main landing gear of the aircraft and includes a braking system operable to decelerate rotation of the wheel about the axle.

A second aspect of the invention provides an aircraft main landing gear, including: a wheel rotatable about an axle; a motor; a braking system operable to decelerate rotation of the wheel about the axle; and a bi-directional clutch operable to connect the wheel with the motor, the bi-directional clutch having a driven configuration in which it permits the wheel to be driven by the motor and an overrunning configuration in which it disconnects the wheel from the motor.

As discussed above, known driven landing gear arrangements such as that disclosed in US2006/0065779 can only be incorporated on nose landing gears. This is because the necessary braking systems fitted to main landing gears take up a large amount of space between the wheel and the landing gear main leg. For example, the space occupied by the double cone clutch in the nose landing gear of US2006/0065779 would be required for mounting of a braking system in a main landing gear.

In preferred embodiments of the second aspect the wheel comprises an inner hub having a central bore through which the axle passes and a substantially annular outer rim extending from the inner hub, the outer rim comprising an axle-facing portion to which the braking system is connectable to prevent rotation of the wheel about the axle, and an outer portion separated from the inner hub by the axle-facing portion, the bi-directional clutch being connectable to the outer portion. Thus, the braking system can be located in an annular volume between the inner hub and the landing gear main lea, while the bi-directional clutch can be located in an annular volume between the outer rim and the leg. In this way, both braking system and bi-directional clutch can be incorporated into a main landing gear. The outer portion may comprise one or more extension members extending outwardly from the outer rim. That is, the bi-directional clutch may be connectable to the outer rim via one or more extension members extending outwardly from the outer rim.

The bi-directional clutch preferably comprises a ring-shaped overrunning track connected to the wheel, a ring-shaped drive track connected to the motor and concentrically aligned with the overrunning track, and a plurality of movable elements retained between the overrunning track and the drive track, the movable elements being movable between: the driven configuration in which they prevent relative rotation between the drive track and the overrunning track to thereby permit the wheel to be driven by the motor; and the overrunning configuration in which they permit relative rotation between the drive track and the overrunning track to thereby disconnect the wheel from the motor. Such an arrangement is particularly suitable for location in an annular volume between the outer rim and the leg of a main landing gear.

A third aspect of the present invention provides an aircraft landing gear, including: a leg arranged to be pivotably connected to the aircraft; an axle connected to the leg; a wheel rotatable about the axle, the wheel having an inner hub with a central bore through which the axle passes and an outer rim extending from the inner hub towards the leg; and a bi-directional clutch operable to connect the wheel with the motor, the bi-directional clutch having a driven configuration in which it permits the wheel to be driven by the motor and an overrunning configuration in which it disconnects the wheel from the motor, wherein the bi-directional clutch is substantially located in an annular volume between the leg and the outer rim of the wheel.

Similarly to the second aspect discussed above, the third aspect enables a main landing gear to be drivable by a motor for ground taxi operations. The prior art clutches disclosed for nose landing gears are not suitable for location in the annular volume between the leg and the outer rim of the wheel because they are too long/wide in the axle axis direction. In order to be accommodated within the landing gear such clutches must be located in the annular volume between the leg and the inner hub of the wheel, this being the volume that must instead accommodate a braking system in a main landing gear.

The landing gear of the third aspect may thus comprise a braking system substantially located in an annular volume between the leg and the inner hub of the wheel.

The bi-directional clutch thus comprises a ring-shaped overrunning track connected to the wheel, a ring-shaped drive track connected to the motor and concentrically aligned with the overrunning track, and a plurality of movable elements retained between the overrunning track and the drive track, the movable elements being movable between: the driven configuration in which they prevent relative rotation between the drive track and the overrunning track to thereby permit the wheel to be driven by the motor; and the overrunning configuration in which they permit relative rotation between the drive track and the overrunning track to thereby disconnect the wheel from the motor. Such a bi-directional clutch is suitable for location in the annular volume between the leg and the outer rim of the wheel.

A fourth aspect of the invention provides a fixed wing aircraft having a landing gear according to the first, second or third aspects, optionally in combination with any of the optional features described herein.

The landing gear preferably comprises a main landing gear of an aircraft. The aircraft preferably comprises an auxiliary power unit (APU) arranged to provide power to the motor.

A fifth aspect of the invention provides a method of operating a landing gear according to the first, second or third aspects, optionally in combination with any of the optional features described herein, the method including the steps of: (i) arranging the bi-directional clutch in the driven configuration and activating the motor to thereby drive rotation of the wheel; and (ii) arranging the bi-directional clutch in the overrunning configuration to thereby permit rotation of the wheel independently of the motor.

Step (i) may be carried out during ground taxiing of an aircraft to which the landing gear is connected. The bi-directional clutch may be automatically arranged in the driven configuration by the action of activating the motor. Step (ii) may be carried out during landing or take-off of an aircraft to which the landing gear is attached. The bi-directional clutch may be automatically arranged in the overrunning configuration as a result of rotation of the wheel at a faster speed than the speed at which the motor drives the wheel.

Any of the optional features discussed above in relation to the various aspects of the invention can be applied to any of those aspects, either alone or in any combination.

BRIEF DESCRIPTION OF THE DRAWINGS

Embodiments of the invention will now be described with reference to accompanying drawings, in which:

FIG. 4 shows section 4-4 of FIG. 2;

FIGS. 5A-5C show isometric views of the landing gear of FIG. 1 with the housing omitted for clarity; and FIGS. 6A-6C show the isometric views of FIGS. 5A-5C with the housing included.

DETAILED DESCRIPTION OF EMBODIMENT(S)

FIGS. 1-6 illustrate an embodiment of the present invention as applied to a main landing gear of a jet powered aircraft. Such aircraft typically have three landing gears: a nose landing gear near the front of the fuselage, and a pair of main landing gears connected to wing or fuselage structure near the joints between the wings and the fuselage. Some very large aircraft may have four main landing gears connected to wing or fuselage structure near the wing-fuselage joints. The present invention may be incorporated in any of these landing gears, but it is envisaged that the invention will be most effective when applied to the main landing gear.

Figure 1:
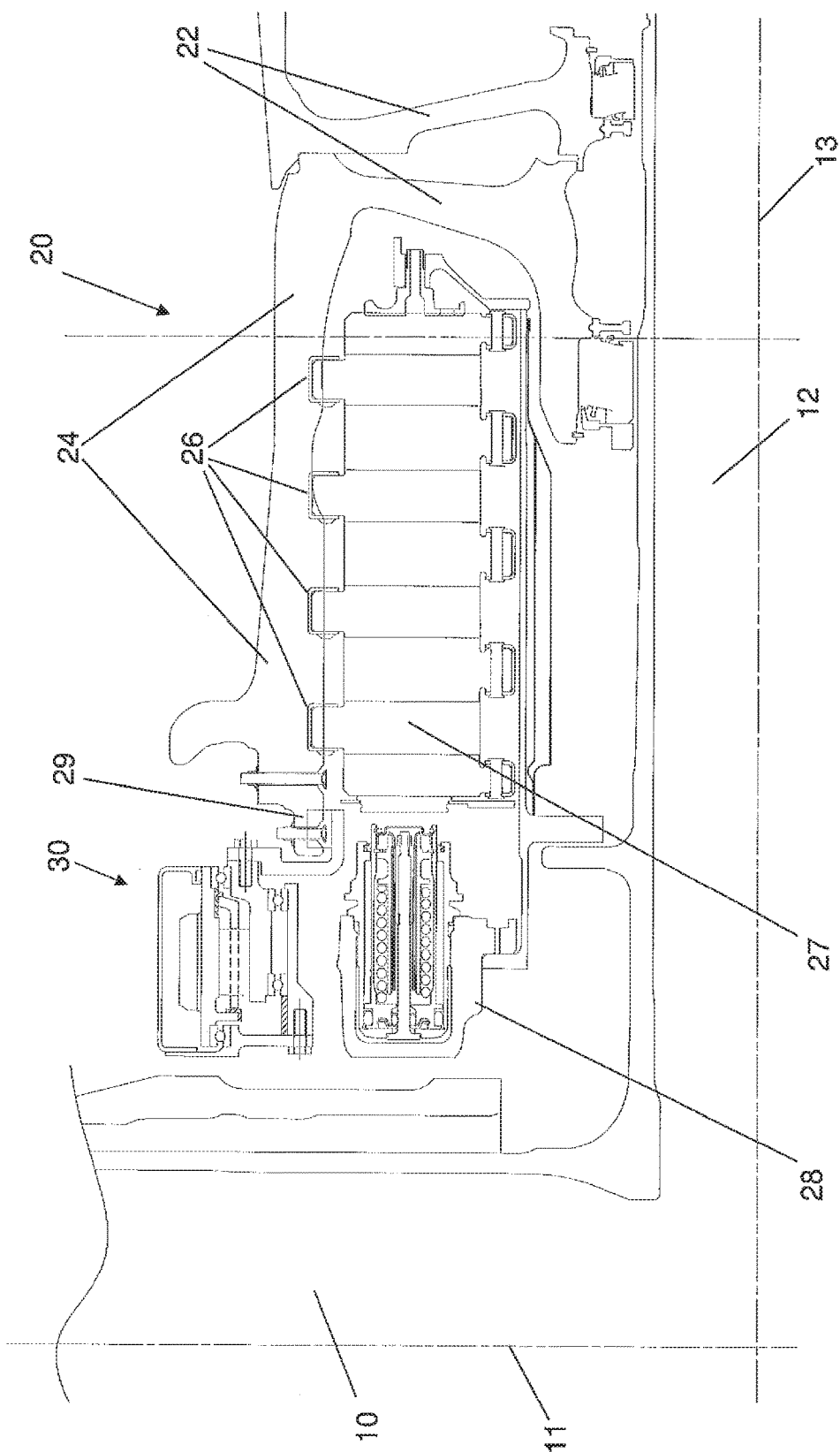
FIG. 1 shows a partial cross-sectional view of a landing gear with a bi-directional clutch according to an embodiment of the present invention.
Figure 2:
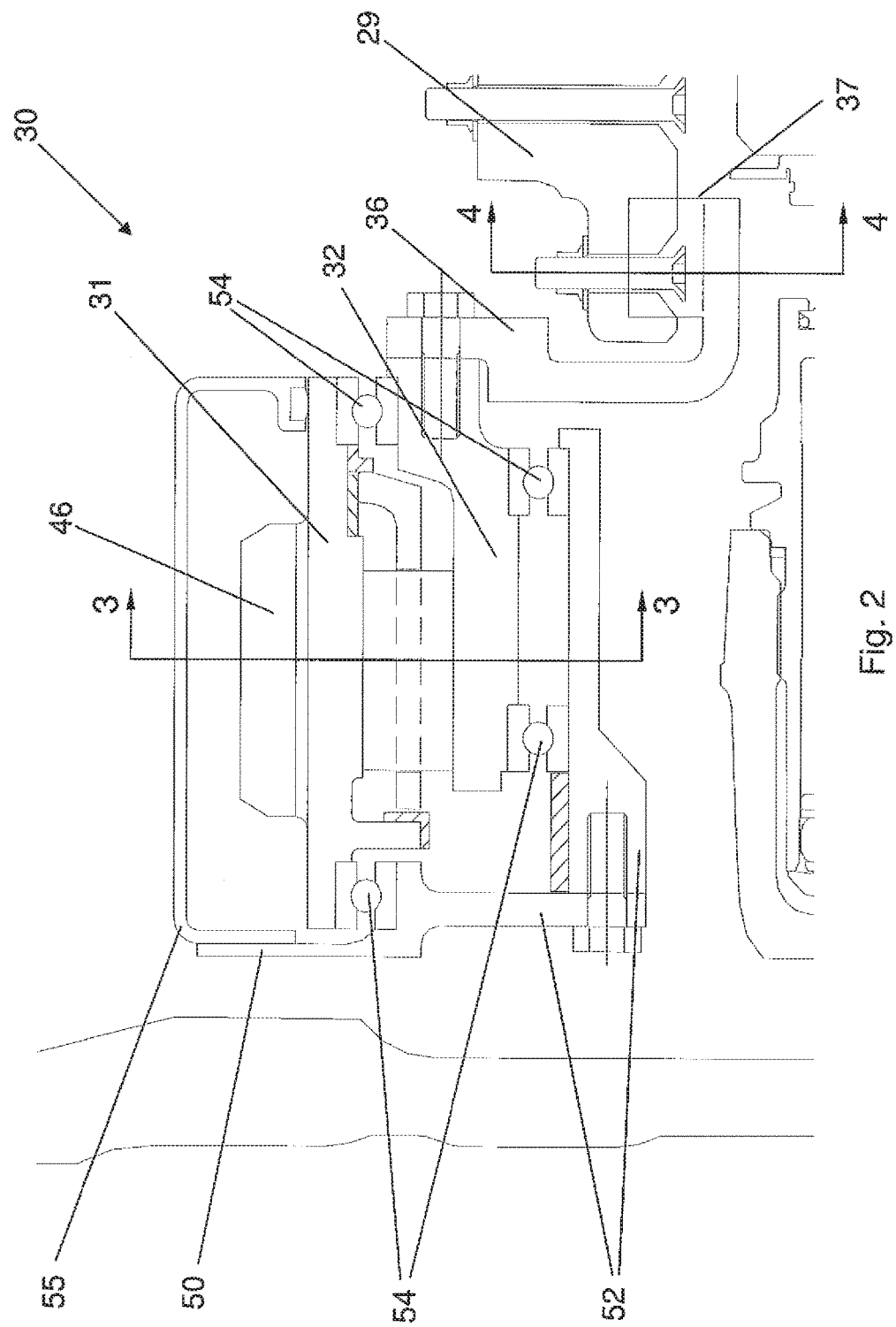
FIG. 2 shows a detail view of the bi-directional clutch of FIG. 1.
Figure 3:
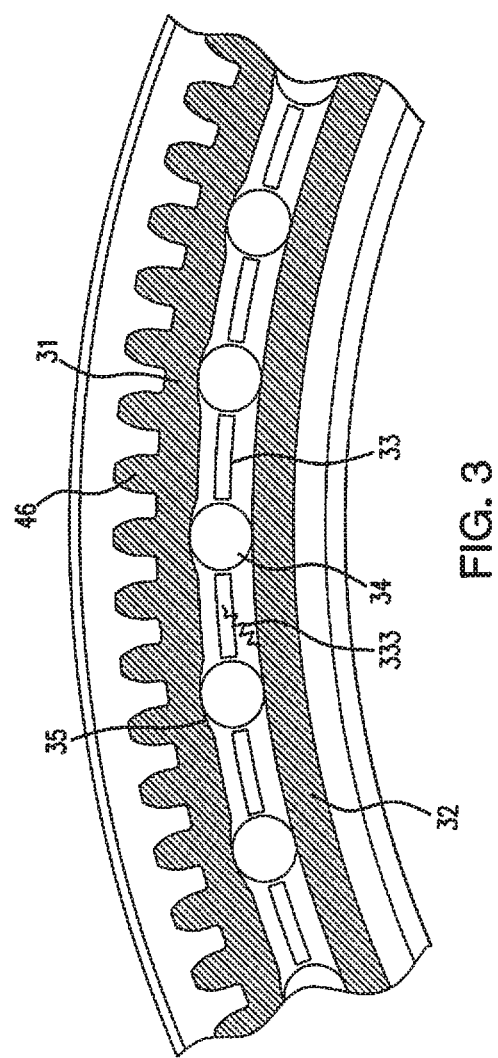
FIG. 3 shows section 3-3 of FIG. 2.

As is best seen in FIG. 1, a landing gear according to an embodiment of the present invention comprises a telescopic shock-absorbing main leg 10 which is hinged at an uppermost end (not shown) to an aircraft fuselage or wing structure (not shown) and supports at its lowermost end an axle 12. The axle 12 supports a wheel 20 (not shown in FIG. 5A-5C or 6A-6C for clarity) which can rotate freely on the axle 12, and which carries a pneumatic tyre (not shown). Note that FIG. 1 does not show the whole landing gear, but only a relevant quadrant; the landing gear is substantially symmetrical about the leg axis 11 and the axle axis 13 so that there is one driven wheel 20 each side of the leg 10. In other embodiments only one of the wheels 20 may be driven.

The wheel 20 includes an inner hub 22 having a bore hole through which the axle 12 passes, and an outer rim 24 on which the tyre (not shown) is retained. In general terms, the inner hub 22 thus comprises the most radially inward portion of the wheel 20 which provides the connection to other landing gear structure, while the outer rim comprises the portion that extends radially outwardly from the inner hub 22. The outer rim 24 comprises an annular flange which is positioned radially outwardly from the inner hub 22 and extends towards the leg 10 along the axle axis 13. The inner surface of the annular outer rim 24 provides a plurality of brake bars (nine in this embodiment). These key with matching channels 26 in a plurality of annular brake discs 27. The brake discs 27 can be activated by a brake actuator 28 to create a frictional engagement between the brake discs 27 to thereby slow rotation of the wheel 20 by engagement of the brake channels 26 with the brake bars. The wheel 20 is generally conventional, with the exception that the outer rim 24 has a plurality of (nine in this embodiment) drive connection extensions 29 distributed uniformly about its circumference, each drive connection extension extending along the axle axis 13 away from the brake channels 26 and towards the leg 10. The drive connection extensions 29 provide a means for connection of a bi-directional overrunning clutch 30 to the wheel 20, as will be further described below.

The bi-directional overrunning clutch 30 is probably best seen in FIGS. 2, 3, 4 and 5. The clutch 30 operates to permit or prevent a drive system 40 to drive the wheel 20. The drive system 40 includes an electric motor 42 which is supplied with power by the auxiliary power unit (APU; not shown) of the aircraft. The motor 42, which includes a gearbox (not shown), drives a pinion gear 44 which meshes with a ring gear 46 so as to rotate the ring gear 46.

The ring gear 46 is rigidly fixed to an outer track (or driven track) 31 of the clutch 30 so that rotation of the ring gear 46 causes rotation of the outer track 31. The outer track 31 comprises an annular member which is arranged co-axially with an annular inner track (or overrunning track) 32 which is attached to the drive connection extensions 29 of the wheel 20 via a drive plate 36. The drive plate 36 comprises a generally annular portion connected at its outer rim to the inner track 32 and having an axially outwardly (away from the leg 10) flange carrying a plurality of (nine in this embodiment) uniformly circumferentially spaced drive keys 37. The drive keys 37 each key with a corresponding drive connection extension 29 to provide a connection between the inner track 32 and the wheel 20 so that the two parts are required to rotate together. The connection between the drive plate 36 and device extensions 29 is designed to accommodate a limited degree of movement between those components, in order to allow for the deflections encountered during use.

A roller cage 33 is retained in the annular space between the inner track 32 and the outer track 31. The roller cage 33 locates and maintains a uniform spacing between a plurality of cylindrical rollers 34 distributed around the annular space. The outer track 31 has a plurality of shallow depressions, or indentations, 35 formed in its roller-facing face.

There is one depression 35 per roller 34, and they are shaped so that when each roller 34 is seated centrally within its respective depression 35 (referred to in the following as the overrunning configuration, and illustrated in FIG. 3) there is sufficient clearance between the rollers 34 and the outer track 31 and inner track 32 that the two tracks can rotate independently. That is, when the rollers 34 are in the overrunning configuration the inner track 32, and thus the wheel 20, can rotate freely.

When the motor 42 drives the ring gear 46, the outer track 31 is initially rotated relative to the inner track 32 no that the rollers 34 are no longer positioned centrally within their respective depressions 35, but are instead forced to a position in which they are seated to one side of the depression (referred to in the following as the driven configuration) where the clearance between the inner and outer tracks 32, 31 is narrowed. The rollers 34 therefore become wedged between the inner and outer tracks 32, 31 so that these two parts are hound together. Thus, when the rollers 34 are in the driven configuration the inner track 32, and thus the wheel 20, are forced to rotate with rotation of the ring gear 46 by the motor 42.

The clutch 30 also includes a spring 333 shown in functional representation or actuator (not shown) which biases the roller cage 33 and rollers 34 to the overrunning configuration.

In operation, in the absence of any input from the motor 42, the wheel 20 will be able to rotate freely about the axle 12 because the rollers 34 are biased towards the overrunning configuration. Such a configuration is necessary for e.g. landing, when the wheel 20 will be travelling at about 195 knots. When the aircraft is on the ground and the pilot wishes to taxi to or from the airport gate, the motor 42 can be activated to drive the ring gear 46 so that the rollers 34 are moved to the driven configuration and the wheel 20 is rotated. The symmetrical shape of the depressions 35 means that the ring gear 46 can be driven in either rotational direction to achieve rotation of the wheel 20 either forwards or backwards. Thus, the pilot can taxi the aircraft both forwards and backwards, at a maximum speed of approximately 20 knots.

In the event that the wheel 20 is caused to rotate faster than the ring gear 46 (e.g. when the aircraft is landing) the relative rotation between the inner and outer tracks 32, 31 causes the rollers 34 to move to the overrunning configuration. This may also provide a failsafe automatic transfer to the overrunning configuration in the event that the spring (not shown) fails to return the rollers 34 to the overrunning configuration after ground taxiing is completed. Such a function may require the addition of a further ring of rollers spring-loaded in the opposite direction to the rollers 34.

The clutch 30 and parts of the drive system 40 are enclosed within a housing 50 (not shown in FIGS. 5A-C for clarity). The housing 50 includes a static housing 52 which is mounted to the axle 12 via brackets 53 and 60. The static housing 52 supports the outer track 31 and inner track 32 via bearings 54 which enable those parts to move relative to the static housing 52. The housing 50 also includes a cover 55, which encloses the pinion gear 44 and ring gear 46. The housing 50 is completely sealed so that the clutch 30 can be well lubricated and protected front debris from e.g. the tyres or runway.

Although the invention has been described above with reference to one or more preferred embodiments, it will be appreciated that various changes or modifications may be made without departing from the scope of the invention as defined in the appended claims.

The invention claimed is:

1. An aircraft landing gear, including:
a wheel rotatable about an axle;
a motor; and
a bi-directional clutch operable to connect the wheel with the motor, the bi-directional clutch comprising a ring-shaped overrunning track connected to the wheel, a ring-shaped drive track connected to the motor and concentrically aligned with the overrunning track, and a plurality of movable elements, each individually movable, retained between the overrunning track and the drive track, the movable elements being movable between: a driven configuration in which the movable elements prevent relative rotation between the drive track and the overrunning track to thereby permit the wheel to be driven by the motor; and an overrunning configuration in which the movable elements permit relative rotation between the drive track and the overrunning track to thereby disconnect the wheel from the motor; wherein the overrunning track is connected to the wheel by a plurality of drive keys.

2. The landing gear according to claim 1, wherein the movable elements are arranged to automatically move from the driven configuration to the overrunning configuration when the overrunning track is rotating faster than the drive track.

3. The landing gear according to claim 1, wherein the driven configuration comprises a forward driven configuration in which the wheel is driven by the motor in a first rotational direction, and a reverse driven configuration in which the wheel is driven by the motor in a second rotational direction opposite to the first rotational direction.

4. The landing gear according to claim 1, wherein the movable elements are biased towards the overrunning configuration.

5. The landing gear according to claim 4, comprising a resilient member arranged to bias the movable elements towards the overrunning configuration.

6. The landing gear according to claim 1, wherein the drive track is positioned radially outwardly from the overrunning track.

7. The landing gear according to claim 1, wherein the wheel comprises: an inner hub having a central bore through which the axle passes; and an outer rim to which the overrunning track is connected.

8. The landing gear according to claim 1, wherein the movable elements comprise a plurality of rollers or sprain, and one of the drive track or the overrunning track has a contact face with a corresponding plurality of indentations or protrusions formed thereon.

9. The landing gear according to claim 8, wherein the contact face has the plurality of indentations formed thereon.

10. The landing gear according to claim 1, comprising a ring gear rigidly connected to the drive track and a pinion gear arranged to mesh with the ring gear, the pinion gear being rotatable by the motor.

11. The landing gear according to claim 1, wherein the landing gear comprises a main landing gear of the aircraft and includes a braking system operable to decelerate rotation of the wheel about the axle.

12. A fixed wing aircraft having the landing gear according to claim 1.

13. The aircraft according to claim 12, wherein the landing gear comprises a main landing gear of the aircraft.

14. An aircraft main landing gear, including:
a wheel rotatable about an axle;
a motor;

a braking system operable to decelerate rotation of the wheel about the axle; and a bi-directional clutch operable to connect the wheel with the motor, the bi-directional clutch having a driven configuration in which the bi-directional clutch permits the wheel to be driven by the motor and an overrunning configuration in which the bi-directional clutch disconnects the wheel from the motor, wherein the bi-directional clutch comprises a ring-shaped overrunning track connected to the wheel, a ring-shaped drive track connected to the motor and concentrically aligned with the overrunning track, wherein the ring-shaped drive track is positioned radially outwardly from the overrunning track, and wherein the overrunning track is connected to the wheel by a plurality of drive keys.

15. The landing gear according to claim 14, wherein the wheel comprises an inner hub having a central bore through which the axle passes and a substantially annular outer rim extending from the inner hub, the outer rim having an axle-facing portion to which the braking system is connected to prevent rotation of the wheel about the axle, and an outer portion separated from the inner hub by the axle-facing portion, the bi-directional clutch being connected to the outer portion.

16. A method of operating the landing gear according to claim 1, the method including the steps of:

arranging the bi-directional clutch in the driven configuration and activating the motor to thereby drive rotation of the wheel; and arranging the bi-directional clutch in the overrunning configuration to thereby permit rotation of the wheel independently of the motor.

* * * * *